F. C. LEHMANN.
MORTISING TOOL.
APPLICATION FILED MAY 23, 1908.

910,929.  Patented Jan. 26, 1909.

Witnesses  
Inventor  
F. C. Lehmann,  
By Woodward & Chandler  
Attorneys

UNITED STATES PATENT OFFICE.

FERDINAND C. LEHMANN, OF NORTH YAKIMA, WASHINGTON.

MORTISING-TOOL.

No. 910,929.     Specification of Letters Patent.     Patented Jan. 26, 1909.

Application filed May 23, 1908. Serial No. 434,601.

*To all whom it may concern:*

Be it known that I, FERDINAND C. LEHMANN, a citizen of the United States, residing at North Yakima, in the county of Yakima and State of Washington, have invented certain new and useful Improvements in Mortising - Tools, of which the following is a specification.

This invention relates to gages and has particular reference to a mortising tool.

An object of the invention is to provide a tool that can be adjusted quickly relative to its parts and to have a positive adjustment of the same.

Another object is to provide a device that will measure off the proper distances by the simple application of the instrument after it has been adjusted.

A further and important object is that the complete device can be stamped from sheet metal in one operation owing to the simplicity of its structure and the small number of parts.

Other objects and advantages will be apparent from the following description and it will be understood that changes in the specific structure shown and described may be made within the scope of the claim and that any suitable materials may be used without departing from the spirit of the invention.

Figure 1:
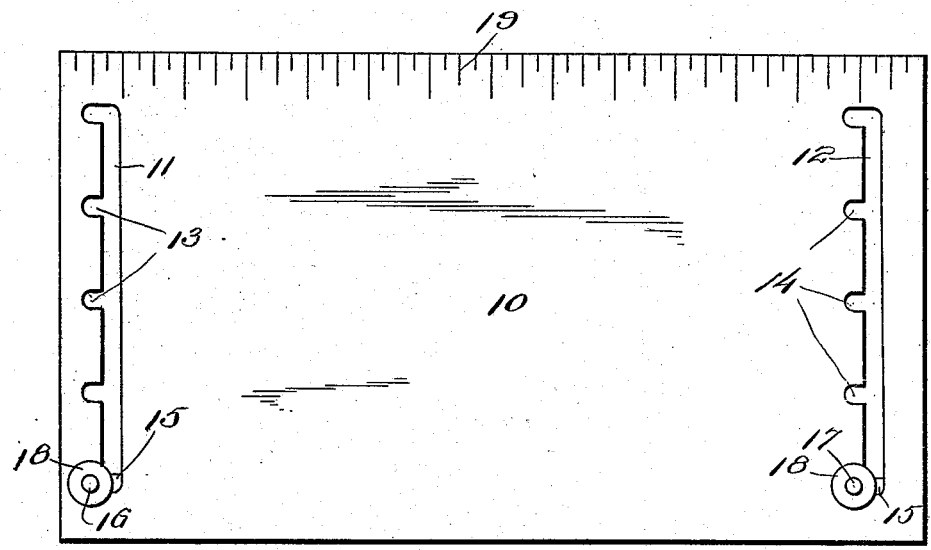
Figure 2:
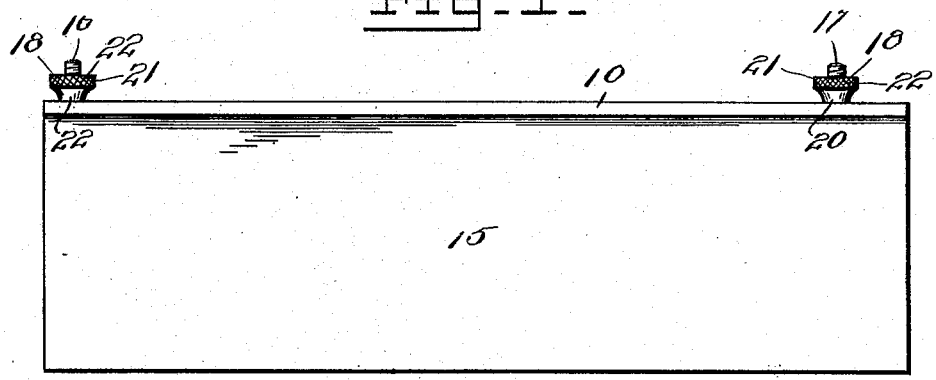
Figure 3:
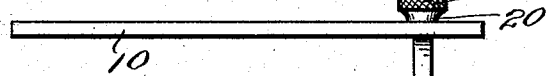

In the drawings forming a portion of this specification, and in which like numerals of reference indicate similar parts in the several views, Figure 1 is a top plan view of the device, Fig. 2 is a side elevation of the same, Fig. 3 is an end elevation.

The device is produced with a metallic plate 10 which is formed with two laterally disposed slots 11 and 12 positioned at the opposite ends of said plate 10. The slots 11 and 12 are provided with series of notches 13 and 14 which extend in the same direction from the sides of the slots 11 and 12 and which are disposed one-half an inch apart. A second plate 15 is provided which carries upwardly projecting bolts 16 and 17 which are threaded on their outer surfaces with right hand threads for the reception of milled thumb nuts 18. The bolts 16 and 17 are adapted to pass upwardly through the slots 11 and 12 and engage in the notches 13 and 14 respectively. The plate 10 carries upon its upper face a scale 19 disposed at one of the longitudinal edges thereof. The thumb nuts 18 comprise collars 20 which are internally threaded and which are enlarged to their upper ends 21 having milled outer surfaces 22 about the enlargement 21.

In operation, the plates 10 and 15 are placed at right angles to each other and the bolts 16 and 17 are inserted in the slots 11 and 12. The plate 15 is moved laterally of the plate 10 until the required measurement is obtained. The measurement being calculated by the notches 13 and 14 disposed at half inch intervals along the slots 11 and 12, when the plate 15 is longitudinally moved along the under side of the plate 10 causing the bolts 16 and 17 to be engaged in the corresponding notches 13 and 14 and the plate is clamped in that position by operating the thumb nuts 18. The thumb nuts 18 are rotated and fed downwardly of the bolts 16 and 17 and are impinged against the upper face of the plate 10 frictionally engaging the upper edge of the plate 15 against the underside of the plate 10 at right angles thereto. The instrument when thus adjusted is applied over the ends of timber to be mortised determining the exact depth of the cuts which are to be made and which may be readily marked along the edge of the plate 10.

What is claimed is:

A tool of the character described comprising a plate having slots and notches formed therein and a scale marked along one edge of said plate, a second plate disposed edgewise at right angles to said first plate, bolts carried by said second plate being adapted to engage slidably in said slots and notches, and thumb nuts carried upon said bolts for the purpose of securing said plates in adjustable relation.

In testimony whereof I affix my signature, in presence of two witnesses.

FERDINAND C. LEHMANN.

Witnesses:
S. R. McCAW,
GEO. E. STACY.